(12) United States Patent
Haensel et al.

(10) Patent No.: US 9,539,549 B2
(45) Date of Patent: Jan. 10, 2017

(54) COMPOSITE SILICONE MEMBRANES OF HIGH SEPARATION EFFICIENCY

(75) Inventors: Rene Haensel, Dorsten (DE); Hardi Doehler, Essen (DE); Peter Schwab, Essen (DE); Peter Seidensticker, Solingen (DE); Michael Ferenz, Essen (DE); Goetz Baumgarten, Haltem am See (DE); Marina Lazar, Recklinghausen (DE); Markus Ungerank, Perg (AT)

(73) Assignee: Evonik Degussa GmbH, Essen (DE)

( * ) Notice: Subject to any disclaimer, the term of this patent is extended or adjusted under 35 U.S.C. 154(b) by 642 days.

(21) Appl. No.: 13/513,225

(22) PCT Filed: Nov. 2, 2010

(86) PCT No.: PCT/EP2010/066604
§ 371 (c)(1),
(2), (4) Date: Jul. 24, 2012

(87) PCT Pub. No.: WO2011/067054
PCT Pub. Date: Jun. 9, 2011

(65) Prior Publication Data
US 2012/0279922 A1    Nov. 8, 2012

(30) Foreign Application Priority Data
Dec. 1, 2009  (DE) .................. 10 2009 047 351

(51) Int. Cl.
*B01D 71/70*    (2006.01)
*B01D 67/00*    (2006.01)
*B01D 69/12*    (2006.01)

(52) U.S. Cl.
CPC ............ *B01D 71/70* (2013.01); *B01D 67/009* (2013.01); *B01D 69/12* (2013.01)

(58) Field of Classification Search
USPC ........................................................ 427/515
See application file for complete search history.

(56) References Cited

U.S. PATENT DOCUMENTS

| | | | |
|---|---|---|---|
| 4,978,726 A | 12/1990 | Döhler et al. | |
| 5,145,915 A | 9/1992 | Weitemeyer et al. | |
| 5,146,005 A | 9/1992 | Weitemeyer et al. | |
| 5,205,934 A * | 4/1993 | Linder et al. | 210/500.43 |
| 5,260,402 A | 11/1993 | Weitemeyer et al. | |
| 5,265,734 A | 11/1993 | Linder et al. | |
| 6,211,322 B1 | 4/2001 | Döhler et al. | |
| 6,268,404 B1 * | 7/2001 | Dohler et al. | 522/99 |
| 6,482,992 B2 | 11/2002 | Scholz et al. | |
| 6,500,991 B2 | 12/2002 | Wiese et al. | |
| 6,960,699 B2 | 11/2005 | Tötsch et al. | |
| 7,138,552 B2 | 11/2006 | Kaizik et al. | |
| 7,154,012 B2 | 12/2006 | Lueken et al. | |
| 7,179,947 B2 | 2/2007 | Lueken et al. | |
| 7,193,116 B2 | 3/2007 | Moeller et al. | |
| 7,232,931 B2 | 6/2007 | Toetsch et al. | |
| 7,250,204 B2 | 7/2007 | Brand et al. | |
| 7,276,541 B2 | 10/2007 | Döhler et al. | |
| 7,317,130 B2 | 1/2008 | Möller et al. | |
| 7,598,334 B2 | 10/2009 | Ferenz et al. | |
| 7,605,284 B2 | 10/2009 | Brueckner et al. | |
| 7,635,581 B2 | 12/2009 | Ferenz et al. | |
| 7,727,599 B2 | 6/2010 | Doehler et al. | |
| 7,759,402 B2 | 7/2010 | Venzmer et al. | |
| 7,776,989 B2 | 8/2010 | Ferenz et al. | |
| 7,838,603 B2 | 11/2010 | Schwab et al. | |
| 7,838,614 B2 | 11/2010 | Thum et al. | |
| 7,855,265 B2 | 12/2010 | Thum et al. | |
| 7,893,128 B2 | 2/2011 | Busch et al. | |
| 8,021,632 B2 | 9/2011 | Baumgarten et al. | |
| 8,129,571 B2 | 3/2012 | Lueken et al. | |
| 8,138,294 B2 | 3/2012 | Henning et al. | |
| 8,138,379 B2 | 3/2012 | Lueken et al. | |
| 8,172,936 B2 | 5/2012 | Herrwerth et al. | |
| 8,198,473 B2 | 6/2012 | Ferenz et al. | |
| 8,211,972 B2 | 7/2012 | Meyer et al. | |

(Continued)

FOREIGN PATENT DOCUMENTS

DE     3 820 294 C1   10/1989
DE   195 07 584 A1    9/1996

(Continued)

OTHER PUBLICATIONS

Silva, Pedro, et al. Solvent transport in organic solvent nanofiltration membranes. J Mem Sci. 262 (2005) 49-59.*
Vandezande, Pieter, et al. Solvent resistant nanofiltration: separating on a molecular level. Chem Soc Rev. 37 (2008) 365-405.*
See Toh, Y.H., et al. In search of a standard method for the characterisation of organic solvent nanofiltration membranes. J Mem Sci. 291 (2007) 120-125.*
International Search Report Issued Dec. 15, 2010 in PCT/EP10/66604 Filed Nov. 2, 2010.
Office Action issued on Oct. 28, 2014 in the corresponding Japanese Patent Application No. 2012-541377 (English Translation only).
U.S. Appl. No. 14/380,647, filed Aug. 22, 2014, Baumgarten, et al.
Office Action issued Apr. 15, 2015, in Chinese Patent Application No. 201080054588.9 filed Nov. 2, 2010 (with English translation).
S. Takahashi, et al., "Gas permeation in poly(ether imide) nanocomposite membranes based on surface-treated silica. Part 2: With chemical coupling to matrix", Polymer, vol. 47, pp. 7535-7547 (2006).

(Continued)

*Primary Examiner* — Krishnan S Menon
*Assistant Examiner* — Ryan B Huang
(74) *Attorney, Agent, or Firm* — Oblon, McClelland, Maier & Neustadt, L.L.P.

(57) ABSTRACT

Composite membrane having a separating membrane layer characterized in that a separating membrane layer is produced by curing laterally modified silicone acrylates of the general Formula I Formula I

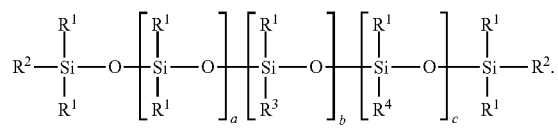

16 Claims, 1 Drawing Sheet

(56) References Cited

U.S. PATENT DOCUMENTS

| | | | |
|---|---|---|---|
| 8,226,829 | B2 | 7/2012 | Wiese et al. |
| 8,404,902 | B2 | 3/2013 | Kreidler et al. |
| 8,461,394 | B2 | 6/2013 | Lueken et al. |
| 2005/0087491 | A1 | 4/2005 | Hennige et al. |
| 2005/0136269 | A1 | 6/2005 | Doehler et al. |
| 2006/0155090 | A1 | 7/2006 | Ferenz |
| 2007/0007195 | A1* | 1/2007 | Ebert et al. .............. 210/490 |
| 2007/0059539 | A1 | 3/2007 | Doehler et al. |
| 2007/0123599 | A1 | 5/2007 | Eilbracht et al. |
| 2007/0135665 | A1 | 6/2007 | Wiese et al. |
| 2007/0149723 | A1 | 6/2007 | Schwab |
| 2007/0197678 | A1 | 8/2007 | Cavaleiro et al. |
| 2007/0295243 | A1 | 12/2007 | Dohler et al. |
| 2007/0299231 | A1 | 12/2007 | Doehler et al. |
| 2008/0187702 | A1 | 8/2008 | Ferenz et al. |
| 2009/0032465 | A1 | 2/2009 | Baumgarten et al. |
| 2009/0136757 | A1 | 5/2009 | Wursche et al. |
| 2009/0149573 | A1* | 6/2009 | Venzmer .............. C08F 283/12 523/201 |
| 2010/0036011 | A1 | 2/2010 | De Gans et al. |
| 2010/0187174 | A1 | 7/2010 | Wursche et al. |
| 2010/0210445 | A1 | 8/2010 | Von Rymon Lipinski et al. |
| 2010/0248325 | A1 | 9/2010 | Eckstein et al. |
| 2010/0266651 | A1 | 10/2010 | Czech et al. |
| 2010/0298485 | A1 | 11/2010 | Frey et al. |
| 2011/0042004 | A1 | 2/2011 | Schubert et al. |
| 2011/0046305 | A1 | 2/2011 | Schubert et al. |
| 2011/0070175 | A1 | 3/2011 | Herrwerth et al. |
| 2011/0091399 | A1 | 4/2011 | Meyer et al. |
| 2011/0230619 | A1 | 9/2011 | Kuppert et al. |
| 2011/0230633 | A1 | 9/2011 | Ferenz et al. |
| 2011/0251070 | A1 | 10/2011 | Poffenberger et al. |
| 2011/0268642 | A1 | 11/2011 | Brausch et al. |
| 2012/0010302 | A1 | 1/2012 | Hartung et al. |
| 2012/0035382 | A1 | 2/2012 | Priske et al. |
| 2012/0046503 | A1 | 2/2012 | Priske et al. |
| 2012/0123079 | A1 | 5/2012 | Ungerank et al. |

FOREIGN PATENT DOCUMENTS

| | | |
|---|---|---|
| EP | 0 979 851 | 2/2000 |
| EP | 1 741 481 | 1/2007 |
| EP | 1 817 097 | 8/2007 |
| EP | 1 931 472 | 6/2008 |
| RU | 2 403 960 | 11/2010 |

OTHER PUBLICATIONS

Office Action dated Nov. 4, 2015 issued in Canadian Patent Application No. 2,782,798.
Office Action Issued Sep. 23, 2015 in Russian Patent Application No. 201212710/05 (042238) filed Nov. 2, 2010.
Written Opinion issued Aug. 14, 2015 in Application No. 201203787-5 filed Nov. 2, 2010.
U.S. Appl. No. 14/653,717, filed Jun. 18, 2015, Fridag, et al.
U.S. Appl. No. 14/435,052, filed Apr. 10, 2015, Fridag, et al.
Office Action issued on Jun. 28, 2016 in Canadian Patent Application No. 2,782,798.
Office Action issued on Jul. 1, 2016 in European Patent Application No. 10773077.2.
Stefan P. Stadtmüller, et al., "Radiation Curable Silicone Acrylates-Synthesis and Application", Silicones in Coatings III, Paper 6, 2000, pp. 1-11.
S. A. Stern, et al., "Structure-Permeability Relationships in Silicone Polymers", Journal of Polymer Science, Part B, Polymer Physics, vol. 25, 1987, pp. 1263-1298 and Cover Page.

* cited by examiner

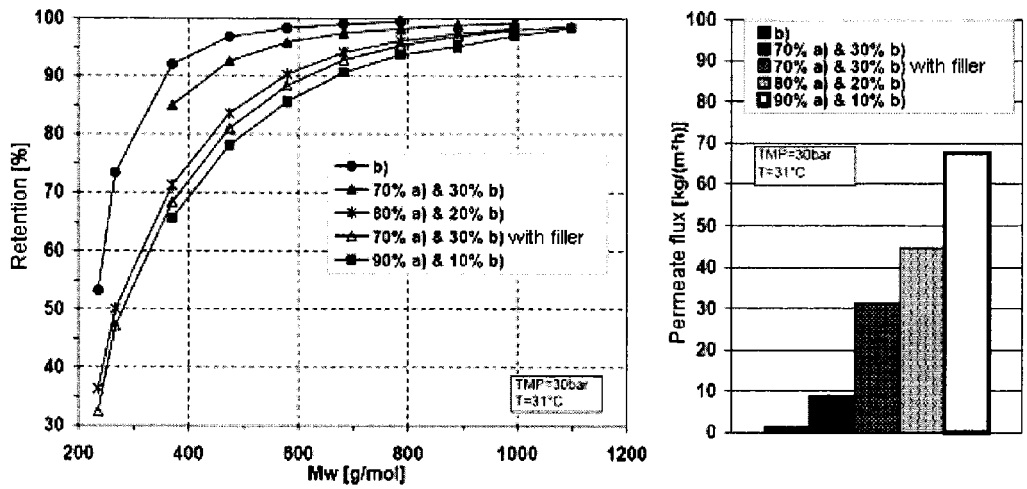

Figure 1: Retention for polystyrenes of different molecular weights and solvent fluxes of silicone acrylate membranes of different compositions. Permeate liquid is n-heptane. (TMP = trans membrane pressure in bar, MW = molecular weight in g/mol)

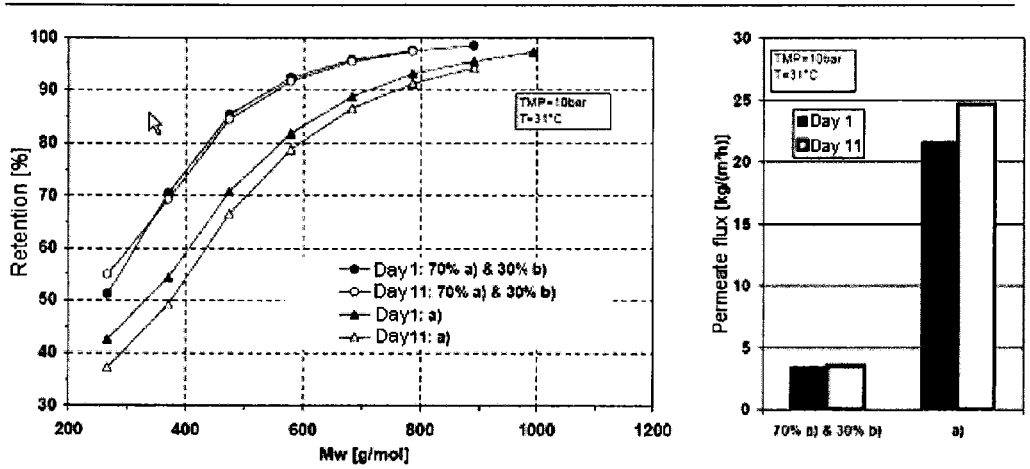

Figure 2: Retention for polystyrenes and solvent fluxes for a membrane according to the invention (30% b) & 70% a)) and a prior art membrane (100% a)) as a function of time

COMPOSITE SILICONE MEMBRANES OF HIGH SEPARATION EFFICIENCY

PRIOR ART

Silicone membranes are suitable for a multiplicity of separation processes. One advantage of silicone membranes is, in particular, that they are resistant to a number of organic solvents and therefore can be used largely without problems in solvent-based membrane processes for example, of organophilic nanofiltration or of gas separation. Solvent-based nanofiltration is a pressure-driven separation process based on membranes, which separates molecules dissolved in organic solvents on the molecular level. Currently, solvent-resistant membranes are used, in particular, in the food industry, petrochemistry, the chemicals industry and for producing pharmaceutical active ingredients in the pharmaceutical industry.

In addition, silicone membranes are used for gas separation (GS). Typical gas separation processes are separating off nitrogen from air, hydrogen recovery, air drying, processes for resolving hydrocarbons and removing volatile organic components. Compared with other polymers that are used in gas separation processes, silicone membranes generally have a significantly higher permeability, but generally have a lower selectivity. Various applications in the field of gas separation are described in detail in the following literature source: Ind. Eng. Chem. Res., Vol. 41, No. 6, 2002.

One example of a solvent-based nanofiltration for which silicone membranes are suitable is hexane recovery in the production of vegetable oils. By using membranes in the recovery of hexane, significant amounts of energy may be saved.

The first step in oil production is oil extraction. During the extraction, the oily raw materials are admixed with hexane. This gives a solution of the oil in hexane which is also termed miscella. The dissolved oil contains up to over 95% of triacyl glycerides and, as minor components, phospholipids, free fatty acids (FFA), pigments, sterols, carbohydrates, proteins and degradation products thereof.

The miscella comprises hexane at 70 to 75%. Oil and hexane can be separated, for example, by a multistage separation by distillation. This requires a comparative high energy consumption for vaporizing the hexane. If, in contrast, a membrane is used for separating off at least a majority of the hexane, a considerable amount of energy may be saved.

A problem which can occur in the use of silicone membranes is insufficient long-term stability in hexane-containing systems, and also the unwanted accumulation of substances on the membrane surface.

The use of silicone composite membranes, also termed composite silicon membranes, in the vegetable oil industry is well known. Research which has taken place in this field is described, for example, in the following literature reference: Fett. Lipid 98(1996), pp. 10-14, JAOCS 79(2002) pp. 937-942. The relationship between the surface hydrophobicity and the accumulation of components on the membrane surface in soya oil miscella solutions has been described in the following literature references: in Colloids and Surfaces, A: Physicochemical and Engineering Aspects 204(2002)31-41.

A further example of solvent-based nanofiltration applications for which silicone membranes are suitable in principle is separating off homogeneous catalysts, e.g. from hydroformulation reaction mixtures: Elements, Degussa-ScienceNewsletter, 18, (2007) 30-35, EP-A1-1 931 472; from reaction mixtures of metathesis: Recovery of Enlarged Olefin Metathesis Catalysts by Nanofiltration in an Eco-Friendly Solvent, A. Keraani, T. Renouard, C. Fischmeister, C. Bruneau, M. Rabiller-Baudry, ChemSusChem 2008, 1, 927, EP 1817097; from Suzuki coupling reaction mixtures: Solvent-Resistant Nanofiltration of Enlarged (NHC)Pd (alkyl)Cl Complexes for Cross-Coupling Reactions, Dirk Schoeps, Volodymyr Sashuk, Katrin Ebert, Herbert Plenio, Organometallics 2009, 28, 3922 or from telomerization reaction mixtures U52009 0032465A1.

An extensive survey of various solvent-based nanofiltration processes (Organic Solvent Nanofiltration, OSN) is given by the literature reference: Chem. Soc. Rev., 2008, 37, 365-405. Here, it is also stated that the silicone membranes of the prior art at best retain 90% of the triglycerides from a hexane solution at the membrane. The triglycerides described there are distinguished by molar masses of 900 g/mol (±10%).

One manufacturer of silicone membranes that are available on the market is GMT Membrantechnik GmbH (Germany). The silicone separation layer of their membranes is produced, for example, using the process described in DE Patent 19507584. In this process, the silicone coatings are additionally crosslinked by irradiation. The swelling of the separation layer in solvent-containing systems is said to be reduced thereby. Nevertheless, the membranes swell significantly in hydrophobic media such as, for example, low-molecular-weight n-alkanes, and significantly lose performance and retention. The membranes, in addition, are very hydrophobic, which leads to significant accumulation of hydrophobic components on the membrane surface, e.g., in a miscella or during concentration of pharmaceutical active ingredients or in the concentration of homogeneous catalyst systems or in the concentration of dyes.

In the Patent Applications US 2007 0007195, EP 1 741 481 and EP 0 979 851, membranes are described in which a separating layer is produced by curing silicone acrylates. In this process, silicone acrylates are used that are solely modified at the chain ends. Indications are also given there to production methods, wherein all methods share the fact that a solvent is also used that must be evaporated off during production. This is disadvantageous, since the solvent vapours must be disposed of.

Furthermore, it has been found that such membranes do not possess improved selectivity over DE19507584 or other membranes of the prior art. Sufficient selectivity for industrial separation tasks generally only occurs when significantly more than 95% of the components that are to be retained are retained at the membrane. All previously known silicone- or silicone acrylate-based membranes do not have such a sufficient retention capacity for said applications.

Against this background, the object of the invention was to provide membranes based on silicones that can separate off at least 95% of components having a molecular mass lower than 800 g/mol from an organic solvent having a molar mass <200 g/mol, preferably <150 g/mol, particularly preferably <120 g/mol. Examples of such solvents are tetrahydrofuran, hexane, heptane, isopropanol, toluene, dichloromethane, acetone and ethyl acetate.

The object was additionally to reduce the high tendency to swelling of the previously known silicone membranes, in particular, e.g., in aliphatic solvents, such as, e.g. hexane and heptane, by suitable crosslinking.

The successful reduction of swelling in the abovementioned solvents is revealed in the retention of the separation properties over time. Membranes according to the prior art exhibit, e.g., in the change from the solvent toluene to the intensely-swelling solvent hexane, a doubling of the molecular exclusion limit (90% retention of a polystyrene of the corresponding molecular weight MWCO) under otherwise identical conditions. This applies explicitly also to membranes which are produced according to EP 1741 481, although it is asserted here that a reduced tendency to swelling has been produced. The examples disclosed in EP 1 741 481 show that the retention capacity changes, which verifies that swelling certainly proceeds. Brief consideration is not sufficient here for the asserted effect=non-swelling.

The object of the invention is additionally to decrease the very hydrophobic properties of the previously known silicone membranes in favour of hydrophilicity by incorporating hydrophilic components into the membrane polymer.

Surprisingly, it has been found that silicon composite membranes which have one or more separating membrane layers have particularly advantageous properties in the context of the objectives.

The object of the invention is therefore achieved by silicone composite membranes which have one or more separating membrane layers if at least one separating membrane layer was produced by curing laterally modified silicone acrylates of the general Formula I.

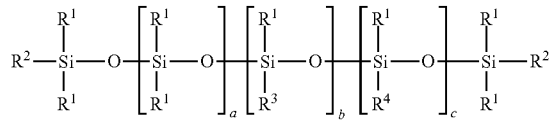

Formula I wherein:
a=25-500, preferably 25-300, in particular 30-200,
b=1-25, preferably 1-15, in particular 1-8,
c=0-20, preferably 0-10, in particular 0,
$R^1$=independent of one another identical or different alkyl or aryls having 1 to 30 carbon atoms which optionally bear ether and/or ester and/or epoxy and/or alcohol functions, preferably identical or different alkyl or aryl radicals having 1 to 30 carbon atoms, in particular methyl or phenyl,
$R^2$=independent of one another identical or different radicals from the group: $R^1$, $R^3$ and $R^4$,
$R^3$=identical or different organic radicals which bear one or more acrylate groups, preferably substituents of the general Formula II or III,

Formula II

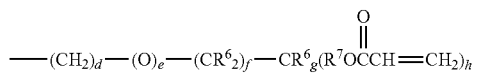

Formula III d=0 to 12, e=0 or 1, f=0-12, g=0-2, h=1-3,
wherein: g+h=3,
$R^6$=independent of one another identical or different alkyl or aryl radicals having 1 to 30 carbon atoms or H,
$R^7$=identical or different divalent hydrocarbon radicals, preferably —$CR^6_2$—, in particular —$CH_2$—
$R^4$=identical or different polyether radicals, preferably identical or different polyether radicals of the general Formula IV

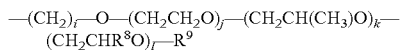

Formula IV i=0-12, preferably 3-7, in particular 3,
j=0-50, k=0-50, l=0-50,
$R^8$=identical or different alkyl or aryl radicals having 2-30 carbon atoms, preferably ethyl and phenyl,
$R^9$=identical or different alkyl or aryl radicals having 2-30 carbon atoms, or H or alkanoyl radicals, preferably methyl, H or acetyl.

The invention also relates to composite membranes produced by curing silicone acrylates of the Formula I that are composed of a plurality of layers of different silicone acrylates.

In addition, it has been found that a particularly advantageous family of silicone membranes may be produced if this is performed by curing a mixture of different silicone acrylates. By means of the selection of the mixture, the properties cut-off limit, degree of crosslinking and hydrophilicity may be set virtually steplessly in previously unknown ranges.

Therefore, these inventions further relate to silicone composite membranes that have one or more separating membrane layers which have been produced by curing a mixture of different silicone acrylates.

Particularly advantageously, the mixture of the different silicone acrylates comprises at least the following components:

a) one or more silicone acrylates having a silicon content of on average >29% by weight, preferably one or more silicone acrylates having a silicon content of on average >29% by weight of the general Formula I, in particular one or more silicone acrylates having a silicon content of >29% by weight of the general Formula I where b=c=0,

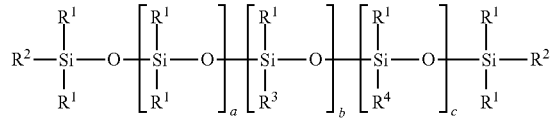

Formula I wherein, for the component a:
a=25-500, preferably 25-300, in particular 30-200,
b=0-15, preferably 0-8, in particular 0
c=0-20, preferably 0-10, in particular 0
with the proviso that when b=0, $R^2=R^3$, b) one or more silicone acrylates having a silicon content of <27.5% by weight, preferably one or more silicone acrylates having a silicon content of <27.5% by weight of the general Formula I, in particular one or more silicone acrylates having a silicon content of <27.5% by weight of the general Formula I where c>3,
wherein, for the component b:
a=1-24, preferably 5-20, particularly preferably 10-20, and in particular 10, 11, 12, 13, 14, 15, 16 or 17, in particular
b=0-25, preferably 3-10, particularly preferably 3, 4, 5, 6, 7 or 8,
c=0-20, preferably 0-10, particularly preferably 0 or 1, 2, 3 or 4, with the proviso that when b=0, $R^2=R^3$.

Preferably, the components a) and b) are present in the mixture in a mass ratio of 10 to 1 to 1 to 10, in particular in the ratio 2 to 8 to 8 to 2.

The structural formulae stated are polymers having a molecular weight distribution. The indices a, b, c, j, k and l are therefore mean values and may not be integral.

The different monomer units of the components stated in the formulae (siloxane chains or polyoxyalkylene chain) can be composed blockwise among one another having any desired number of blocks and any desired sequence, or be subject to a statistical distribution. The indices used in the formulae must be considered to be statistical mean values.

The silicon content of the silicone acrylates is influenced by the degree of organic modification. The more organic ligands are bound to the siloxane backbone, the lower the silicon content. It has been found that silicone composite membranes having advantageous properties are obtained when they have a separating layer which is produced by curing a mixture of different silicone acrylates. In this case, one or more relatively highly modified silicone acrylates having a Si content of less than 27.5% by weight (component b) are cured as a mixture with one or more relatively less-modified silicone acrylates having a Si content of >29% by weight (component a).

The properties of the membranes that are obtained using a mixture of silicone acrylates according to the invention has advantageous properties, as is shown hereinafter.

Particularly advantageous properties result if, as component a), silicone acrylates are used that are only modified at the chain ends, what are termed α,ω-modified silicone acrylates. In addition, advantageous properties are displayed if, as component b), laterally modified silicone acrylates are used.

In addition to the silicone acrylates, it can be expedient to add a number of other substances such as, for example, fillers, stabilizers, colours or organic acrylates to the mixture. This enumeration is not to be considered comprehensive.

The present invention describes novel composite membranes which have at least one separating layer that are produced by special silicone acrylates or a mixture of silicone acrylates.

For production of the composite membranes according to the invention, suitable materials as substructure are generally solvent-resistant porous three-dimensional structures which can serve as supporting material such as nonwovens or microfiltration or ultrafiltration membranes or separators, such as battery separators such as Separion® (trade mark of Evonik Degussa GmbH) or Solupor®.

In principle, all structures provided for filtrations and/or phase separations are suitable which can be modified by the special silicone acrylates according to the invention to form composite membranes.

The invention further relates also to composite membranes that are obtained by curing the silicone acrylates according to the invention of the Formula I using a photoinitiator by electromagnetic radiation at a wavelength that is less than 800 nm, and/or by electron beams. In particular, the curing proceeds via UV radiation at wavelengths below 400 nm.

The invention further relates also to the composite membranes containing the cured silicone acrylates according to Formula I that, as support membranes, have an ultrafiltration membrane.

In particular, the use of mixtures of different silicone acrylates permits the properties of the membranes to be set in a targeted manner. By setting a defined mixing ratio it is possible to adapt the membrane to certain requirements and to address special separation problems.

Evonik Goldschmidt GmbH offers a number of commercially available silicone acrylates that are suitable for producing membranes according to the invention.

Typical products of Evonik Goldschmidt GmbH are TEGO® RC 902, TEGO® RC 715. TEGO® RC 902 and TEGO® RC 715 are linear polymers which are only modified at the chain ends. TEGO® RC 902 has a silicon fraction of, for example, 34% by weight and TEGO® RC 715 has a silicon fraction of, for example, 32% by weight—these are products that are modified to a comparatively low extent. Laterally modified siloxanes that have a silicon fraction of, for example, 24% by weight are also available. The fraction of organic components/groups is relatively high compared to the silicon oxide backbone. TEGO® RC 902 and TEGO® RC 715 correspond, for example, to the linear chain-end-modified polymers of the component a) when mixtures of different silicone acrylates are used, whereas laterally modified polymers correspond to the component b).

The above-described silicone composite membranes are produced by coating of porous support materials e.g. on the basis of microfiltration or ultrafiltration membranes or separators. As support material that can be used in this case are in principle all known macro porous materials: K.-V. Peinemann and S. Nunes, Membrane Technology in the Chemical Industry, Wiley-VCH Verlag GmbH, 2006. Particularly suitable, as porous support materials are membranes selected from the group of the following materials: polyacrylonitrile (PAN), polyimide (PI), polyether ether ketone (PEEK), polyvinylidene fluoride (PVDF), polyamide (PA), polyamide-imide (PAI), polyethersulfone (PES), polybenzimidazole (PBI), sulphonated polyether ketone (SPEEK), polyethylen (PE), polypropylen (PP), and also inorganic porous materials and/or ceramic membranes or polymer ceramic membranes produced using aluminium oxide, titanium dioxide, zirconium dioxide, silicon oxide and/or titanium nitrite, and also mixtures and/or modifications or composites of the named various support membrane materials.

The above-described silicone composite membranes are suitable for separation tasks in organic solvents. Depending on the embodiment, they are able to separate off or retain with a retain fraction rate of at least 90% by weight, preferable >95 weight percent, more preferable >98 weight percent and in particular >99 weight percent of dissolved molecules having a molecular weight of less than 2000 g/mol, preferably molecules having a molecular weight of less than 1000 g/mol, and particularly preferably molecules having a molecular weight of less than 500 g/mol.

In a particularly preferred embodiment of the invention, by means of the membranes according to the invention, from components of differing molecular masses that are dissolved in an organic solvent, at least 95% of components having a molecular mass less than 800 g/mol may be separated off, preferably having a molar mass <200 g/mol, particularly preferably <150 g/mol, and in particular <120 g/mol. Examples of such retainable solvents are tetrahydrofuran, hexane, heptane, isopropanol, toluene, dichloromethane, acetone and ethyl acetate, preferable hexane or heptane.

The dissolved molecules can in principle be all molecules that are soluble in the respective solvent. Therefore, the invention further relates to the use of the silicone composite membranes according to the invention e.g. for separating off homogeneous catalyst systems from reaction mixtures, for separating triglycerides from solvents like e.g. hexane, heptane, ethanol or acetone, for separating off oligomers from monomer solutions, or for separating off (pharmaceutical) active ingredients or precursors thereof from reaction mixtures or solutions.

The invention relates also further to a use of the silicone-polyacrylate composite membranes for retaining or separating of homogeneous catalyst systems from reaction mixtures, for separating triglycerides from solvents having a molecular weight of less than 200 g/mol, for separating off oligomers from monomer solutions, or for separating off (pharmaceutical) active ingredients or precursors thereof from reaction mixtures or solutions.

Preferred solvents used in these processes are hydrocarbons with 1 to 8 carbon atoms, preferred hexane or heptane, its isomers or mixtures, or else $CO_2$.

The composite membranes according to the invention are suitable, in particular, for purifying substances, since, for example at fixed separation parameters such as temperature, pressure and solvent, molecular weight fractions below fixed ranges may be separated off from solutions in a targeted manner. Under typical system conditions such as, e.g., 30° C., 30 bar pressure (TMP—Trans membrane Pressure), in this manner molecular weight fractions of less than 1000 g/mol, preferably less than 600 g/mol, and in particular less than 300 g/mol, can be separated off from solutions in n-heptane.

Proceeding from a mixture of laterally modified and terminally α,ω-modified silicone acrylates, the membrane separation efficiency may be set in a targeted manner (within broad limits) for the different solvent systems (see in this context also FIG. 1 or FIG. 2).

The invention further relates to a process for producing a composite membrane, wherein a support membrane is coated with at least one silicone acrylate of the Formula I and/or mixtures of various silicone acrylates, and is subsequently cured at room temperature by electromagnetic radiation and/or electron beam radiation.

The silicone acrylate or if appropriate the silicone acrylate mixture is optionally added with co-use of a solvent to a roller system as is conventionally used, e.g., for coating anti-stick coatings of support materials for, e.g., labelling use—particularly advantageously, for this purpose, no further solvent is used. A photoinitiator is added in advance to the silicone acrylate. By means of the roller system, the silicone acrylate is applied to the membrane material in layer thicknesses of 0.3-2 micrometres and is cured by a free-radical mechanism by means of UV radiation or electron beam radiation. Further thermal energy is not required. The silicone acrylate is cured immediately after passing through the reaction chamber. In the reaction chamber, free radical sites are quenched by oxygen, for which reason it is essential to inertize the reaction chamber with nitrogen.

EXAMPLES

In the examples described hereinafter, the present invention will be described for illustration of the invention, without intending to restrict the invention, the range of application of which results from the entire description and the claims, to the embodiments cited in the examples. If ranges, general formulae or classes of compound are cited hereinafter, these should comprise not only the corresponding ranges or groups of compounds that are mentioned explicitly, but also all subranges and subgroups of compounds which can be obtained by extraction of individual values (ranges) or compounds. If, in the context of the present description, documents are cited, the contents thereof shall be incorporated completely in the disclosure of the present invention. If, in the context of the present invention, compounds such as, e.g., organically modified silicone acrylate are described that can have multiple various monomer units, these can occur statistically distributed (statistic oligomer) or arranged (block oligomer) in these compounds. Statements on the number of units in such compounds must be taken to mean statistical mean values, taking the mean over all corresponding compounds.

Production of the Membranes

On the basis of ultrafiltration membranes available on the market that are made of polyacrylonitrile obtainable from, e.g., the company GMT, Rheinfelden or GE-Osmonics, Vista, USA, distributed by the company Desalogics, Ratzeburg, coatings were performed with TEGO silicone acrylates from Evonik Goldschmidt GmbH. The coatings were carried out in layers with a smooth-roll application appliance having 5 rolls. The coatings were performed at a coating weight of 0.6 to 1.5 $g/m^2$. The coatings were crosslinked via a UV lamp in an inert nitrogen atmosphere. For this purpose, a suitable photoinitiator such as, e.g., a hydroxyketone, is added to the silicone acrylates in an amount of 1/100 based on the silicon mass. In this manner, on the basis of said ultrafiltration membrane, composite membranes are generated that have different mixtures and layer sequences of component a) and component b) corresponding to the silicone acrylates. The following coatings were produced having different mass fractions of the component a) and component b) in each case based on the total amount of silicone acrylate:

90% by weight a) & 10% by weight b);
80% by weight a) & 20% by weight b), with additional 3% by weight of inorganic filler based on the total amount of silicone acrylate;
70% by weight a) & 30% by weight b) with additional 3% by weight of inorganic fillers based on the total amount of silicone acrylate and without inorganic fillers and also
100% by weight b).

The components a) and b) according to formula 1 as used in the examples have the following constitution:

Component a) a=83, b=0, c=0, $R^1$=$CH_3$, $R^2$=$(CH_2)_3$—O—$CH_2$—$C(C_2H_5)(CH_2O$—$C(O)$—CH=$CH_2)_2$ $_{Si\text{-}content}$=34.2% per weight Component b) a=13, b=5, c=0, $R^1$=$R^2$=$CH_3$ $_{R^3}$=substituent according to Formula II Si-content=23.8% per weight The components are produced using methods according to the prior art, as described, for example in DE 3820294 C1 (U.S. Pat. No. 4,978,726).

As inorganic filler, silica was used.

As a comparative type of a membrane of the prior art, a membrane was studied that was produced exclusively on the basis of TEGO® RC 902 corresponding to component a).

The membranes produced were characterized by what is termed the molecular weight cut-off (MWCO) method in n-heptane. The MWCO method is described, for example, in the following literature: Journal of Membrane Science 291 (2007)120-125. The method is based on measuring the retention of various styrene oligomers in dependence on their molecular weight (MWCO curve).

By using the MWCO method, it is possible to estimate to what extent a dissolved substance having a defined molecular weight may be separated off. In FIG. 1 and FIG. 2, the molar mass (Mw) of the dissolved substances, here polystyrenes, are plotted against the retention at the membrane studied in each case, in % by weight, derived from concentrations by mass.

The stability of the separating layer was determined by determining the MWCO curve and the permeability of the membrane over a long period in n-heptane.

The membranes were tested by means of a cross-flow filtration. The operating temperature was 30° C. and the transmembrane pressure (TMP) 30 bar. In the long-term experiments, a pressure of 10 bar was employed. The membranes were conditioned using pure solvents until a steady-state flux was achieved. Subsequently, the pure solvent was replaced by a mixture of solvent and oligo-styrene indicator. After a steady-state flux was again achieved, samples of permeate and feed stream were taken off and the fraction of styrene oligomer determined by analogy with the MWCO method.

FIGS. 1 and 2 show the results of the retention capacity for polystyrenes having different molecular weights, and also the solvent fluxes of the silicone acrylate membranes of different composition. Permeate liquid is n-heptane.

The results in FIG. 1 verify that the properties of the separating membrane layers can be set in a targeted manner by a mixture of the various TEGO RC products from a membrane having an excellent separation efficiency, but a low flux, to a membrane having a high flux, but a lower separation efficiency. In this manner by mixing the various silicone acrylates, the property profile of the membrane may be set in a targeted manner for an application.

It can be seen from the MWCO curves that the membrane having the highest fraction of the component a) of 90% has the lowest relative retention and the highest permeate flux. On the other hand, a membrane that consists of 100% of component b) has virtually no longer any permeate flux for n-heptane and a very high retention. The results shown of the 20/80 and 30/70 mixtures with and without fillers show that the properties can be set virtually steplessly.

The comparison test of the membranes according to the invention having a composition 30% b) & 70% a) with silicone membranes according to the prior art (100% a)) were carried out in n-heptane as described above. After a further 11 days of constant operation of the membrane at 10 bar and 30° C. in hexane, the MWCO test was carried out again.

The results shown in FIG. 2 demonstrate that the membrane according to the invention has a separation limit shifted significantly to lower molecular weights.

It follows from the marked shift of the separation curve of the prior art membrane to higher molecular weights and increase in permeate flux that this membrane is not stable in heptane. The membrane according to the invention shows no relevant change in permeate flux performance and in separation properties as a function of operating time, which verifies the stability of the membrane in n-heptane.

The invention claimed is:

1. A composite membrane, comprising: a separating membrane layer and a support membrane,
wherein the separating membrane layer comprises a cured mixture of silicone acrylates, the mixture comprising:
from 70 to 90% by weight of a component (A); and
from 10 to 30% by weight of a component (B);
wherein
component (A) is at least one silicone acrylate of Formula I, having a silicon content of on average greater than 29% by weight,

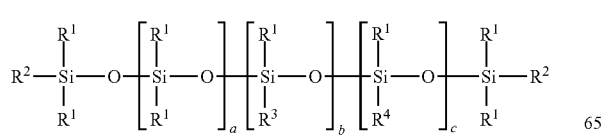

Formula I wherein,
a is from 25 to 500,
b is 0,
c is from 0 to 20, and
each $R^2=R^3$, and
component (B) is at least one silicone acrylate of Formula I, having a silicon content of less than 27.5% by weight, wherein,
a is from 1 to 24,
b is from 3 to 25,
c is from 0 to 20, and
each $R^2$ is $R^1$ or $R^4$,
each $R^1$ is independently an alkyl or aryl radical having from 1 to 30 carbon atoms, optionally comprising an ether group, an ester group, an epoxy group, an alcohol group, or a combination thereof,
each $R^3$ is independently an organic radical comprising one or more acrylate groups, and
each $R^4$ is independently a polyether radical.

2. The composite membrane of claim 1,
wherein $R^3$ is of Formula II or III:

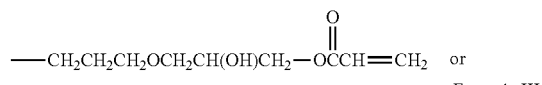

Formula II or

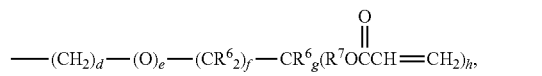

Formula III d is from 0 to 12,
e is 0 or 1,
f is from 0 to 12,
g is from 0 to 2,
h is from 1 to 3,
g+h=3,
each $R^6$ is H or an alkyl or aryl radical having 1 to 30 carbon atoms,
each $R^7$ is a hydrocarbon radical.

3. The composite membrane of claim 1,
wherein each $R^4$ is independently of Formula IV:

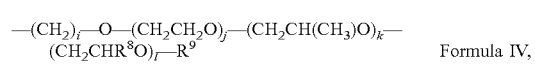

Formula IV, i is from 0 to 12,
j is from 0 to 50,
k is from 0 to 50,
l is from 0 to 50,
each $R^8$ independently an alkyl or aryl radical having from 2 to 30 carbon atoms,
each $R^9$ is independently H, an alkanoyl radical, or an alkyl or aryl radical having from 2 to 30 carbon atoms.

4. The composite silicone membrane of claim 1, wherein a mass ratio of (A) to (B) is from 10:1 to 1:10.

5. The composite membrane of claim 1,
wherein said curing is with a photo-initiator by electromagnetic radiation having a wavelength less than 800 nm, by an electron beam, or by both.

6. The composite membrane of claim 1,
wherein the support membrane is at least one solvent persistent porous three-dimensional support structure selected from the group consisting of a nonwoven membrane, a micro-filtration membrane, an ultrafiltration membrane, and a separator.

7. The composite membrane of claim 1,
wherein the support membrane comprises at least one porous support material selected from the group consisting of polyacrylonitrile (PAN); polyimide (PI); polyether ether ketone (PEEK); polyvinylidene fluoride (PVDF); polyamide (PA); polyamide-imide (PAI); polyethersulfone (PES); polybenzimidazole (PBI); sulphonated polyether ketone (SPEEK); polyethylen (PE); polypropylen (PP); an inorganic porous material, ceramic membrane, or polymer ceramic membrane obtained from aluminium oxide, titanium dioxide, zirconium dioxide, silicon oxide, titanium nitrite, or a combination thereof; and mixtures, modifications or composites thereof.

8. A process for retaining dissolved molecules, comprising:
retaining dissolved molecules having a molecular weight of less than 2000 g/mol with the composite membrane of claim 1,
wherein a retain fraction rate of the retaining is at least 90% by weight.

9. The process of claim 8,
wherein the dissolved molecules are a homogeneous catalyst system to be separated from a reaction mixture, a triglyceride to be separated from a solvent having a molecular weight of less than 200 g/mol, an oligomer to be separated from a monomer solution, or a pharmaceutical active ingredient or precursor thereof to be separated from a reaction mixture or solution.

10. The process of claim 9,
wherein the dissolved molecules are to be separated from a hydrocarbon with 1 to 8 carbon atoms, an isomer or mixture thereof, or else $CO_2$.

11. The process of claim 8,
wherein the retaining comprises separating off a molecular weight fraction of less than 1000 g/mol from a solution in n-heptane at 30° C., 30 bar pressure.

12. A process for producing the composite membrane of claim 1, comprising:
coating a support membrane with the mixture of silicone acrylates, to obtain a coated support membrane, and subsequently
curing the coated support membrane by electromagnetic radiation, electron beam radiation, or both.

13. The composite membrane of claim 2,
wherein an $R^7$ group is $—CR^6_2—$.

14. The composite membrane of claim 13,
wherein an $R^7$ group is $—CH_2—$.

15. The composite membrane of claim 3, wherein i is from 3 to 7.

16. The process of claim 12, wherein curing the coated support membrane comprises curing by electromagnetic radiation having a wavelength less than 800 nm.

* * * * *